(12) United States Patent
Yamamoto et al.

(10) Patent No.: US 8,395,579 B2
(45) Date of Patent: Mar. 12, 2013

(54) DISPLAY DEVICE AND TELEVISION RECEIVER

(75) Inventors: Kaori Yamamoto, Osaka (JP); Shuki Yamamoto, Osaka (JP); Hiroshi Kunii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 12/736,876

(22) PCT Filed: May 20, 2009

(86) PCT No.: PCT/JP2009/059262
§ 371 (c)(1),
(2), (4) Date: Nov. 18, 2010

(87) PCT Pub. No.: WO2009/147946
PCT Pub. Date: Dec. 10, 2009

(65) Prior Publication Data
US 2011/0063526 A1    Mar. 17, 2011

(30) Foreign Application Priority Data
Jun. 3, 2008  (JP) ................................. 2008-146102

(51) Int. Cl.
G09G 3/36 (2006.01)
(52) U.S. Cl. ....................................................... 345/102
(58) Field of Classification Search .................... 345/102
See application file for complete search history.

(56) References Cited

U.S. PATENT DOCUMENTS

| | | | |
|---|---|---|---|
| 5,844,540 A | 12/1998 | Terasaki | |
| 6,466,196 B1 | 10/2002 | Isogawa et al. | |
| 2003/0214494 A1* | 11/2003 | Morishita et al. | 345/204 |
| 2005/0248694 A1 | 11/2005 | Nakayama | |
| 2006/0022935 A1* | 2/2006 | Sakai et al. | 345/102 |
| 2007/0132712 A1* | 6/2007 | Song | 345/102 |
| 2010/0165602 A1* | 7/2010 | Kuromizu | 362/97.2 |
| 2011/0096247 A1* | 4/2011 | Cho | 348/739 |

FOREIGN PATENT DOCUMENTS

| | | |
|---|---|---|
| CN | 1983368 | 6/2007 |
| JP | 06-333695 | 12/1994 |
| JP | 07-325286 | 12/1995 |
| JP | 11-084377 | 3/1999 |
| JP | 2000-195695 | 7/2000 |
| JP | 2004-021104 | 1/2004 |

(Continued)

OTHER PUBLICATIONS

English language abstract RU 63073, publication date 2007.*

(Continued)

Primary Examiner — Dorothy Harris
(74) Attorney, Agent, or Firm — Harness, Dickey & Pierce, P.L.C.

(57) ABSTRACT

A display device includes a light source and a light source driver configured to drive the light source. In at least one embodiment, the light source driver is configured to drive the light source with brightness control. It is capable of generating pulse width modulation signals using different dimming. A dimming frequency is selected from the different dimming frequencies according to an installation mode of the display device.

10 Claims, 16 Drawing Sheets

FOREIGN PATENT DOCUMENTS

| | | |
|---|---|---|
| JP | 2006-005776 | 1/2006 |
| JP | 2006-114324 | 4/2006 |
| JP | 2007-034120 | 2/2007 |
| JP | 2008-251459 | 10/2008 |
| RU | 63073 | 5/2007 |
| WO | WO 2008/139663 | 11/2008 |

OTHER PUBLICATIONS

Russian Decision on Grant and English translation thereof dated Feb. 6, 2012.

International Search Report, dated Aug. 18, 2009.

* cited by examiner

| Frequency level | Dimming frequency (Hz) | Installation mode |
|---|---|---|
| 1 | 230 | Wall mount mode |
| 2 | 240 | |
| 3 | 250 | |
| 4 | 260 | |
| 5 | 270 | Stand mode |

DISPLAY DEVICE AND TELEVISION RECEIVER

TECHNICAL FIELD

The present invention relates to a display device and a television receiver.

BACKGROUND ART

In a display device using non-light-emitting optical components, such as a liquid crystal display device, a backlight unit including light sources is disposed behind a display panel, such as a liquid crystal panel, for illuminating the display panel. Brightness of the display panel is adjustable through driving of the light sources with brightness control by an inverter.

Known methods for controlling the brightness of light sources include a voltage dimming control and a plus width modulation (PWM) dimming control. The voltage dimming control is a dimming method in which a voltage applied to the light sources is varied using an inverter. With this method, a wide dimming range cannot be achieved.

The PWM dimming control is a dimming method in which the light sources are periodically turned on and off with modulated turn-on to turn-off period ratios. With this method, a wide dimming range can be achieved by adjusting the turn-on period and the turn-off period. Therefore, the PWM dimming control is widely used in backlight units of liquid crystal display devices.

In a backlight unit using the PWM dimming control for controlling the brightness, roaring sounds may be produced due to second and third harmonics of a dimming frequency during the brightness control of the light source. Such roaring sounds may annoy users and thus should be reduced. To reduce such roaring sounds, a display device including a light-emitting component driving unit in which a dimming frequency for PWM signals is set higher than an upper limit of the audible range of human is disclosed in Patent Document 1.

Patent Document 1: Japanese Published Patent Application No. 2006-114324

SUMMARY

The inventors of the present invention have focused on periodic vibrations of a chassis that houses light sources, which may be a cause of the roaring sounds. The roaring sounds may be caused by resonance between the chassis and the light sources that vibrate according to the dimming frequency. The resonance may even increase the roaring sounds. To reduce the roaring sounds, a means for selecting a dimming frequency that is less likely to resonate with the chassis, that is, a frequency different from a natural vibration frequency of the chassis may be considered. However, the liquid crystal display device is used in various applications, that is, the natural vibration frequency of the chassis varies based on how the liquid crystal display device is installed. For example, the natural vibration frequency of the chassis in the case that the display device is mounted to a wall differs that in the case that the display device is held by a stand. Namely, the frequency that is less likely to resonate with the chassis varies. Especially in the liquid crystal display device, a thickness of which is reduced in response to current market demands, a distance between the light source and the chassis is small and thus vibrations of those components are more likely to resonate. Therefore, the roaring sounds may be increased.

The present invention was made in view of the foregoing circumstances. An object of the present invention is to provide a display device that is less likely to produce roaring sounds in any installation mode. Another object of the present invention is to provide a television receiver including such a display device.

To solve the above problem, a display device of the present invention includes a light source and a light source driver configured to drive the light source. The light source driver is configured to drive the light source with brightness control using a pulse width modulation signal. The light source driver is capable of generating the pulse width modulation signal using different dimming frequencies. Any one of the dimming frequencies is selected from the different dimming frequencies according to an installation mode of the display device.

With this configuration, the dimming frequency at which roaring sounds are less likely to be produced can be selected according to an installation mode of the display device. Therefore, the roaring sounds can be reduced. One of causes of the roaring sounds is resonance between the light source and a chassis that houses the light source. Because the light source is driven with brightness control using the pulse width modulation signal, it vibrates according to the dimming frequency used for the pulse width modulation signal. If the frequency of the vibration is close to the natural vibration frequency of the chassis, the roaring sounds are produced or increased. The natural vibration frequency of the chassis varies according to the installation mode of the display device, in which a supporting member is mounted to the display device or a variation in load occurs. The dimming frequency at which the resonance with the chassis is less likely to be produced is difficult to be determined because it changes according to the installation mode of the display device. Therefore, the display device of the present invention is configured such that the light source driver can generate a pulse width modulation signal using different dimming frequencies and a dimming frequency can be selected from the different dimming frequencies according to the installation mode of the display device. With this configuration, the dimming frequency at which the resonance with the chassis is less likely to occur can be selected according to the installation mode of the display device. As a result, the roaring sounds are less likely to be produced.

BRIEF DESCRIPTION OF THE DRAWINGS

FIG. 15 is a table containing dimming frequencies stored in a memory; and

DETAILED DESCRIPTION OF EXAMPLE EMBODIMENTS

First Embodiment

The first embodiment of the present invention will be explained with reference to FIGS. 1 to 7. A television receiver TV including a liquid crystal display device 10 as a display device will be explained.

Figure 1:
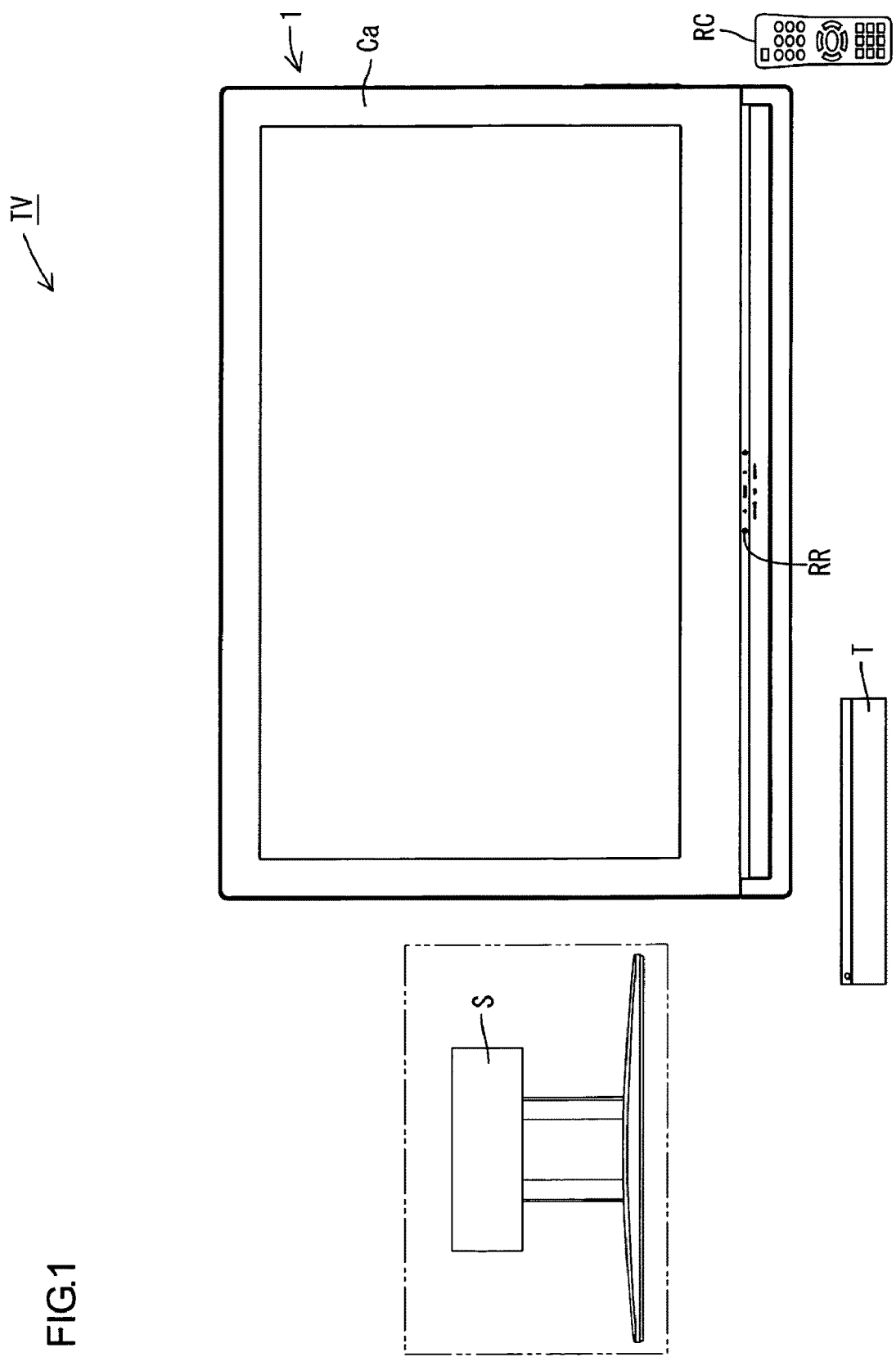
FIG. 1 is a front view illustrating a construction of a television receiver according to the first embodiment of the present invention.
Figure 2:
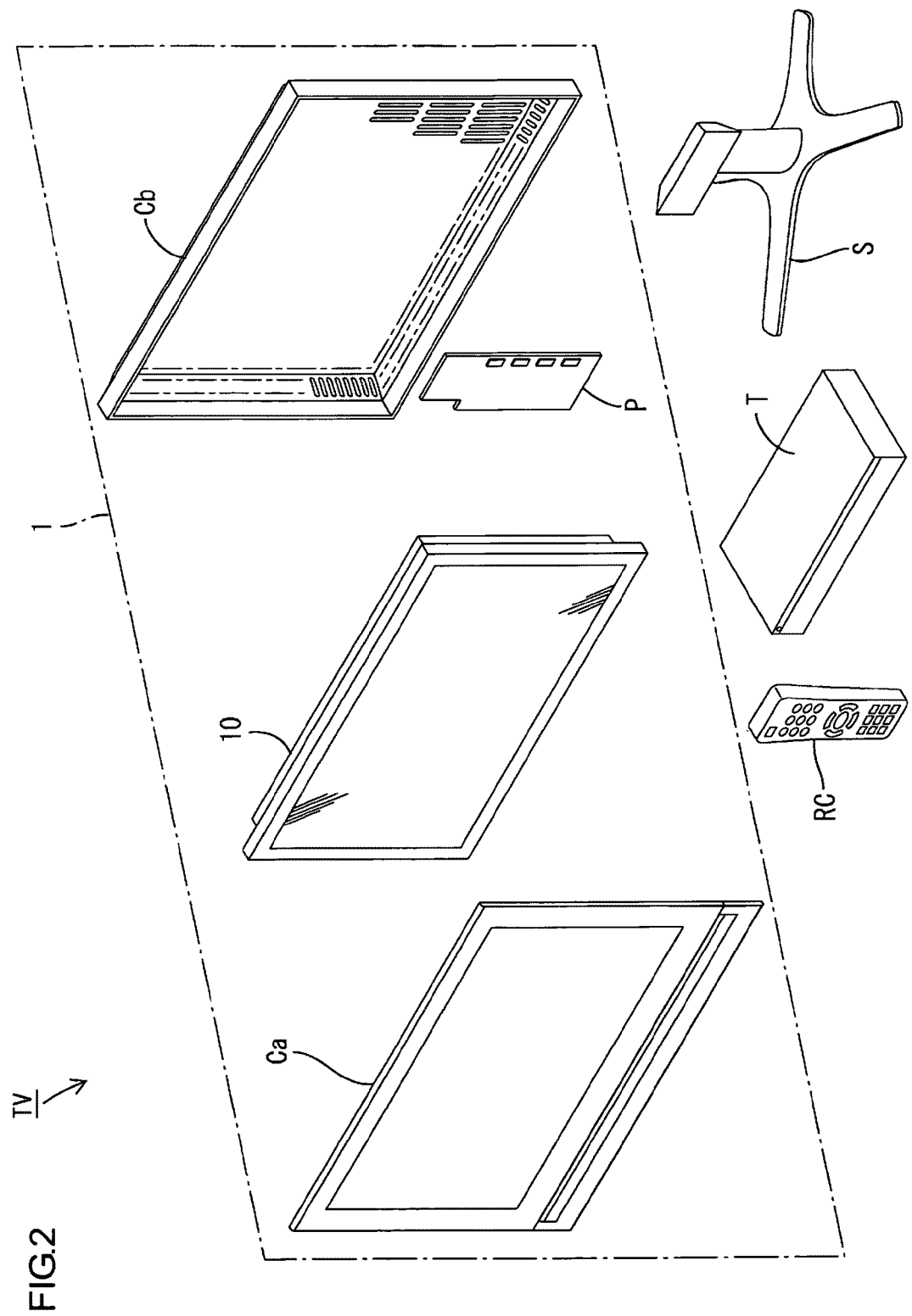
FIG. 2 is an exploded perspective view illustrating a construction of the television receiver in FIG. 1.
Figure 3:
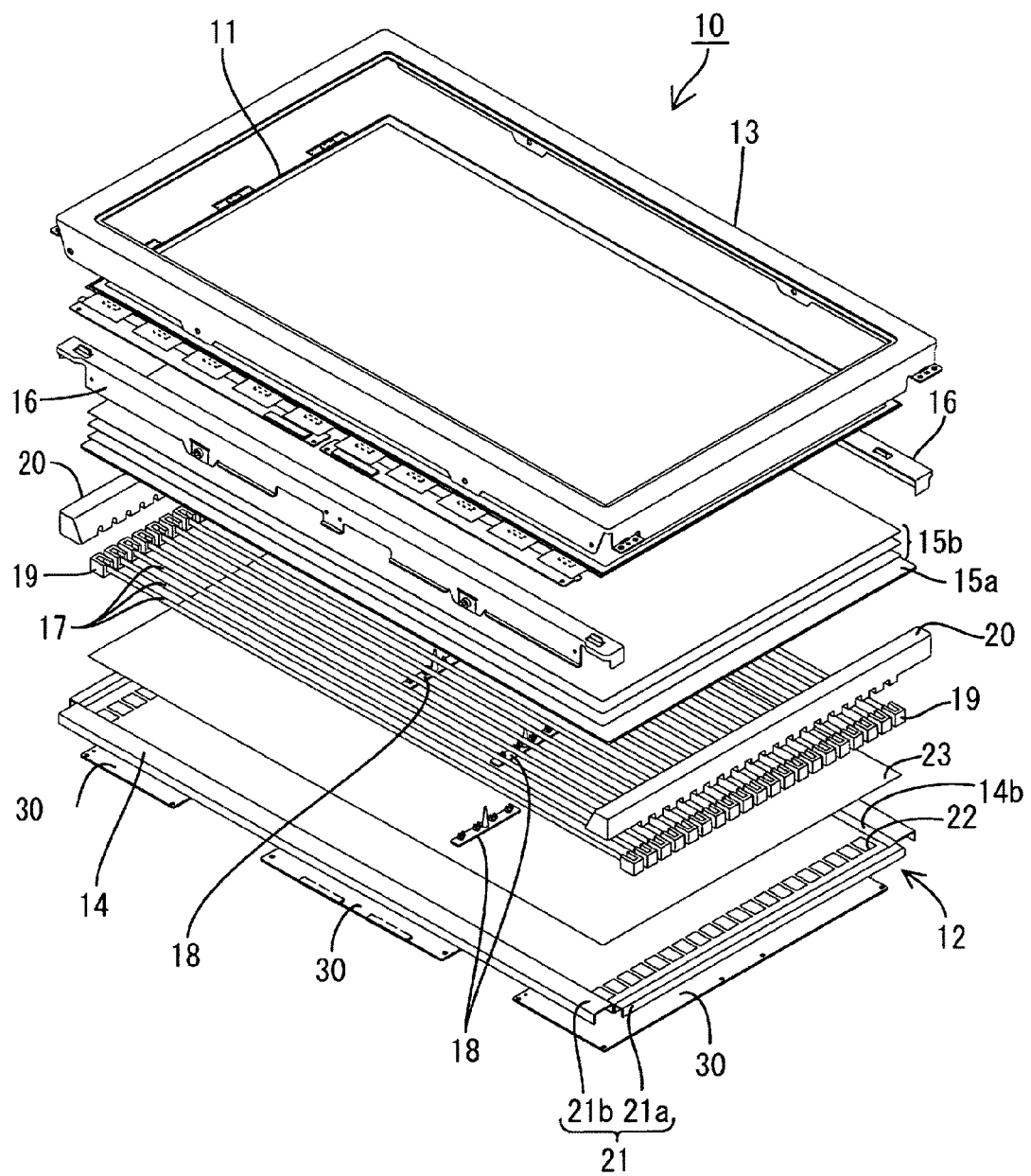
FIG. 3 is an exploded perspective view illustrating a general construction of a liquid crystal display device included in the television receiver.
Figure 4:
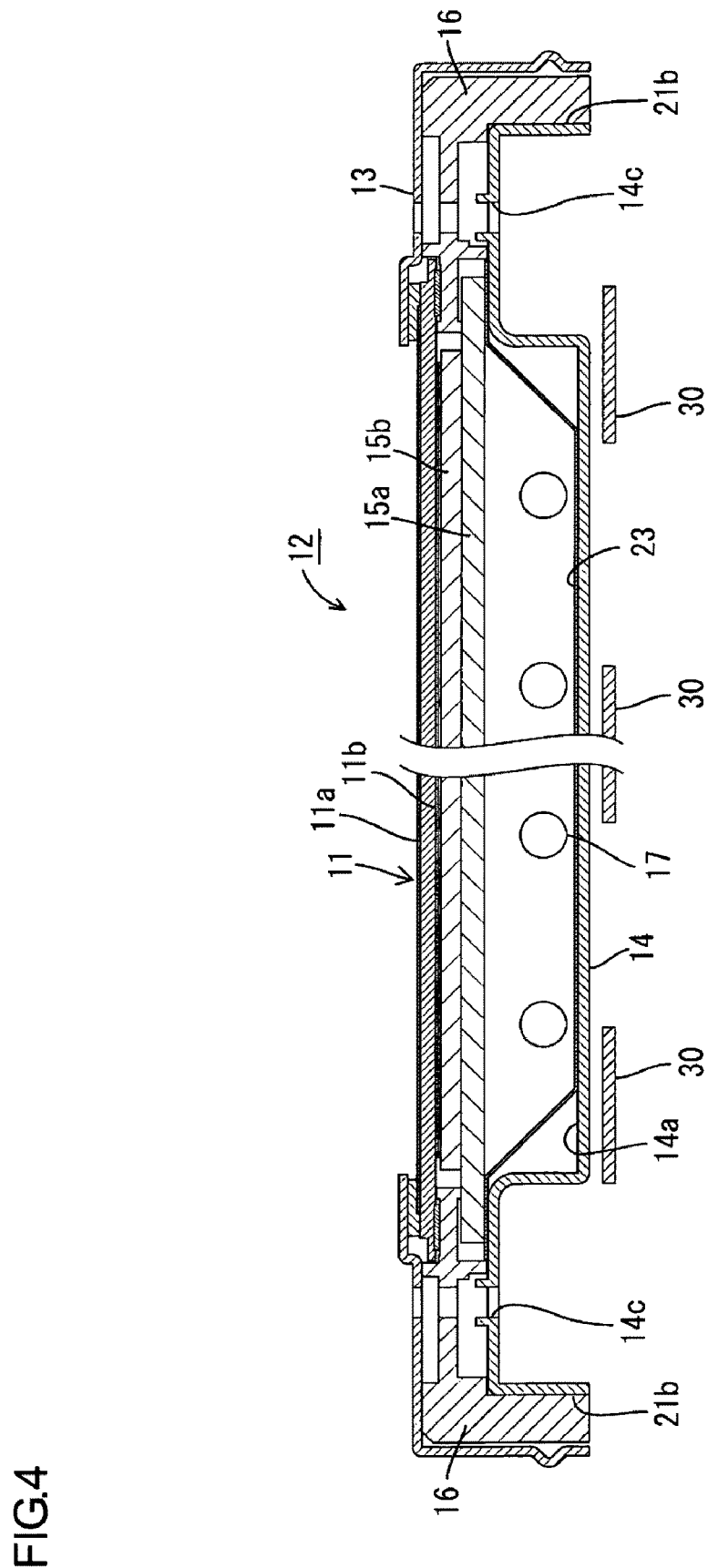
FIG. 4 is a cross-sectional view of the liquid crystal display device in FIG. 3 along a short-side direction thereof.
Figure 5:
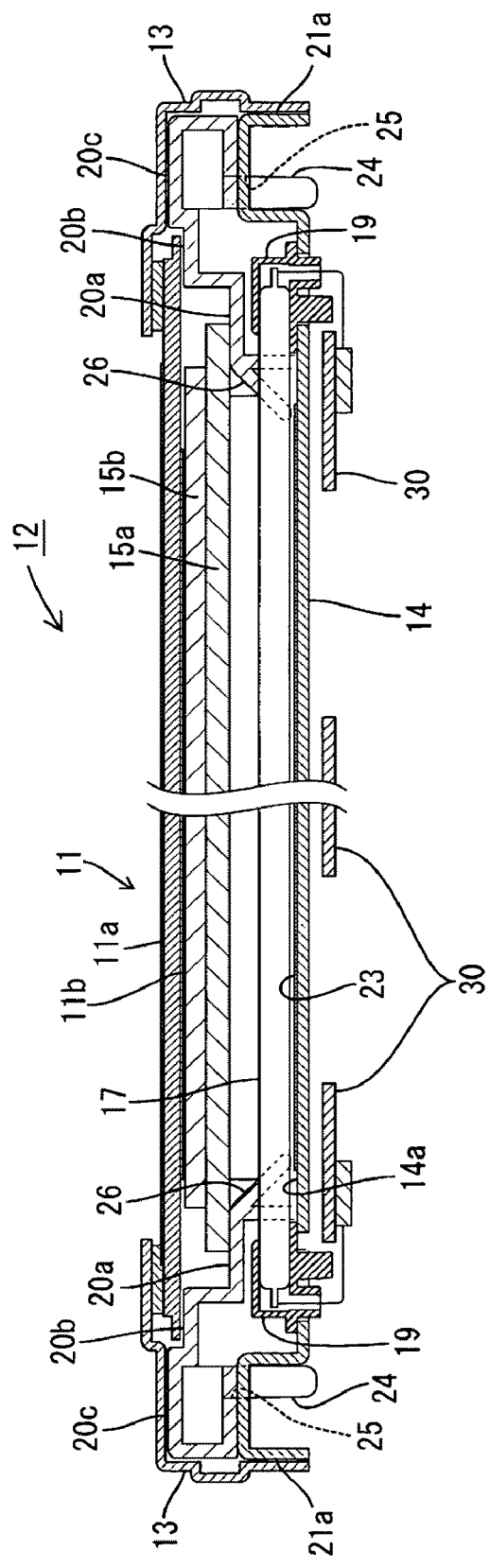
FIG. 5 is a cross-sectional view of the liquid crystal display device in FIG. 3 along a long-side direction thereof.

FIG. 1 is a front view illustrating a construction of a television receiver of this embodiment. FIG. 2 is an exploded perspective view illustrating a construction of the television receiver in FIG. 1. FIG. 3 is an exploded perspective view illustrating a general construction of a liquid crystal display device included in the television receiver in FIG. 1. FIG. 4 is a cross-sectional view of the liquid crystal display device in FIG. 3 along a short-side direction thereof. FIG. 5 is a cross-sectional view of the liquid crystal display device in FIG. 3 along a long-side direction thereof.

As illustrated in FIGS. 1 and 2, the television receiver TV of this embodiment includes a television receiver main unit 1, a tuner T, a stand S and a remote control RC. The main unit 1 includes a liquid crystal display device (a display device) 10, front and rear cabinets CA and CB that house the liquid crystal display device 10 therebetween, and a power source P. The stand S can be removed and the television receiver TV can be mounted to a wall in a room (see FIG. 1). This is a first installation mode (hereinafter referred to as a wall mount mode). The television receiver TV can be installed in a second installation mode (hereinafter referred to as a stand mode) in which the stand is attached to the bottom of the main unit 1 and the main unit 1 is held by the stand.

As illustrated in FIG. 1, the television receiver TV has a remote control signal receiver RR (a signal receiver) in a lower middle section of the front cabinet Ca for receiving infrared rays output from the remote control RC. The remote control. RC outputs infrared signals to the remote control signal receiver RR. In the main unit 1, channel or volume setting is changed. Moreover, a dimming frequency is selected for a pulse width modulation signal S2 when the infrared signal is received. This will be explained later.

The liquid crystal display device 10 has a landscape rectangular overall shape and housed in the front and rear cabinets Ca, Cb in a vertical position. As illustrated in FIG. 3, the liquid crystal display device 10 includes a liquid crystal panel (a display panel) 11, which is a display panel, and a backlight unit 12, which is an external light source. They are held together with a frame shaped bezel 13.

Next, the liquid crystal panel 11 and the backlight unit 12 included in the liquid crystal display device 10 will be explained (see FIGS. 3 to 5).

The liquid crystal panel (the display panel) 11 is constructed such that a pair of glass substrates is bonded together with a predetermined gap therebetween and liquid crystals are sealed between the glass substrates. The liquid crystals are materials that change optical characteristics according to applications of electrical fields. On one of the glass substrates, switching components (e.g., TFTs) connected to source lines and gate lines that are perpendicular to each other, pixel electrodes connected to the switching components, and an alignment film are provided. On the other substrate, color filter having color sections such as R (red), G (green) and B (blue) color sections arranged in a predetermined pattern, counter electrodes, and an alignment film are provided. Polarizing plates 11a and 11b are attached to outer surfaces of the substrates (see FIGS. 4 and 5).

As illustrated in FIG. 2, the backlight unit 12 includes a chassis 14, a diffuser plate 15a, a plurality of optical sheets 15b and frames 16. The chassis 14 has a substantially box shape with an opening 14b on the light output side (on the liquid crystal panel 11 side). The diffuser plate 15a is arranged so as to cover the opening 14b of the chassis 14. The optical sheets 15b are arranged between the diffuser plate 15a and the liquid crystal panel 11. The frames 16 are arranged along long sides of the chassis 14 so as to hold long-side edges of the diffuser plate 15a by sandwiching them between the chassis 14 and the frames 16. Cold cathode tubes 17 (a light sources), lamp clips 18, relay connectors 19 and holders 20 are housed in the chassis 14. The lamp clips 18 are used for mounting the cold cathode tubes 17 to the chassis 14. The relay connectors 19 make electrical connections at the ends of the cold cathode tubes 17. The holders 20 collectively cover the ends of the cold cathode tubes and the relay connectors 19. A light output side of the backlight unit 12 is a side closer to the diffuser plate 15a than the cold cathode tubes 17.

The chassis 14 is made of metal. The chassis 14 is formed in a substantially shallow box shape by metal plate processing. It has a rectangular bottom plate 14a and folded outer rim portions 21 (short-side folded outer rim portions 21a and long-side folded outer rim portions 21b), each of which extends upright from the corresponding side of the bottom plate 14a and has a substantially U shape. The bottom plate 14a has a plurality of through holes, that is, mounting holes 22, along the long-side edges thereof. The relay connectors 19 are mounted in the mounting holes 22. As illustrated in FIG. 4, fixing holes 14c are provided in the top surface of the chassis 14 along the long-side outer rims 21b to bind the bezel 13, the frames 16 and the chassis 14 together with screws and the like.

A light reflecting sheet 23 is disposed on an inner surface of the bottom plate 14a of the chassis 14 (on a side that faces the cold cathode tubes 17). The light reflecting sheet 23 is a synthetic resin sheet having a surface in white color that provides high light reflectivity. It is placed so as to cover almost entire inner surface of the bottom plate 14a of the chassis 14. As illustrated in FIG. 4, long-side edges of the light reflecting sheet 23 are lifted so as to cover the long-side outer rims 21b of the chassis 14 and sandwiched between the chassis 14 and the diffuser plate 15a. With this light reflecting sheet 23, light emitted from the cold cathode tubes 17 is reflected toward the diffuser plate 15a. On the outer surface of the bottom plate 14a of the chassis 14 (on a side opposite from the cold cathode tubes 17), a controller board set 30 is provided for drive control of the cold cathode tubes 17.

On the opening 14b side of the chassis 14, the diffuser plate 15a and the optical sheets 15b are provided. The diffuser plate 15a includes a synthetic resin plate containing scattered light diffusing particles. It diffuses linear light emitted from the cold cathode tubes 17. The short-side edges of the diffuser plate 15a are placed on the first surface 20a of the holder 20 as described above, and does not receive a vertical force. As illustrated in FIG. 4, the long-side edges of the diffuser plate 15a are sandwiched between the chassis 14 (or the reflecting sheet 23) and the frame 16 and fixed.

The optical sheets 15b provided on the diffuser plate 15a includes a diffuser sheet, a lens sheet and a reflecting type polarizing plate layered in this order from the diffuser plate 15a side. Light emitted from the cold cathode tubes 17 passes through the diffuser plate 15a and enters the optical sheets 15b. The optical sheets 15b convert the light to planar light. The liquid crystal display panel 11 is disposed on the top surface of the top layer of the optical sheet 15b. The optical sheet 15b are held between the diffuser plate 15a and the liquid crystal panel 11.

Each cold cathode tube 17 has an elongated tubular shape. A plurality of the cold cathode tubes 17 are installed in the chassis 14 such that they are arranged parallel to each other with the long-side direction thereof (the axial direction) aligned along the long-side direction of the chassis 14 (see FIG. 3). Each cold cathode tube 17 is held with the lamp clips 18 (not shown in FIGS. 4 and 5) slightly away from the bottom plate 14a (or the reflecting sheet 23). Each end of each cold cathode tube 17 has a terminal (not shown) for receiving drive power and is fitted in the corresponding relay connector 19. The holders 20 are mounted so as to cover the relay connectors 19. The cold cathode tubes 17 are driven according to pulse width modulation signals (PWM signals). The amount of light can be reduced (i.e., the light can be modulated) by changing a time ratio between turn-on time and turn-off time (i.e., a duty ratio).

Each cold cathode tube 17 in this embodiment has a tube diameter of 4.0 mm. It is held 0.8 mm away from the bottom plate 14a of the chassis 14 and 2.7 mm away from the diffuser plate 15a. The adjacent cold cathode tubes 17 are 16.4 mm apart from each other. In the backlight unit 12, the distances between the components are reduced so that the thickness of the backlight unit 12 is reduced. The distance between each cold cathode tube 17 and the diffuser plate 15a, and the distance between each cold cathode tube 17 and the bottom plate 14a of the chassis 14 are especially reduced. Because the thickness of the backlight unit 12 is reduced, the thin television receiver can be provided. More specifically, the thickness of the liquid crystal display device 10 (i.e., the thickness between the front surface of the liquid crystal panel 11 and the rear surface of the backlight unit 12) is 16 mm, and the thickness of the television receiver TV (i.e., the thickness between the front surface of the front cabinet Ca and the rear surface of the rear cabinet Cb) is 34 mm.

The holders 20 that cover the ends of the cold cathode tubes 17 are made of white synthetic resin. Each holder 20 has an elongated substantially box shape and extends along the short-side direction of the chassis 14 (see FIG. 3). As illustrated in FIG. 5, each holder 20 has steps on the front side such that the diffuser plate 15a and the liquid crystal panel 11 are held at different levels. A part of the holder 20 is placed on top of a part of the corresponding short-side outer rim 21a of the chassis 14 and forms a side wall of the backlight unit 12 together with the short-side outer rim 21a. An insertion pin 24 projects from a surface of the holder 20 that faces the outer rim 21a of the chassis 14. The holder 20 is mounted to the chassis 14 by inserting the insertion pin 24 into the insertion hole 25 provided in the top surface of the short-side outer rim 21a of the chassis 14.

The steps of the holder 20 include three surfaces parallel to the bottom plate 14a of the chassis 14. The short edge of the diffuser plate 15a is placed on the first surface 20a located at the lowest level. A sloped cover 26 extends from the first surface 20a toward the bottom plate 14a of the chassis 14. A short edge of the liquid crystal panel 11 is placed on the second surface 20b. The third surface 20c located at the highest level is provided such that it overlaps the short-side outer rim 21a of the chassis 14 and comes in contact with the bezel 13.

Figure 6:
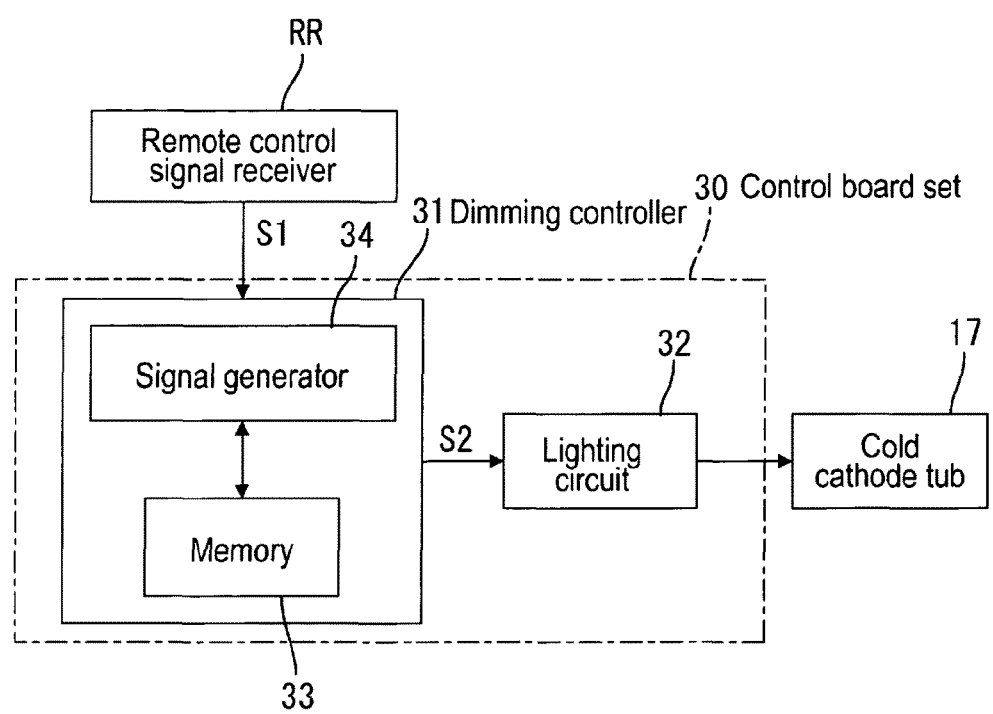
FIG. 6 is a block diagram illustrating a configuration for selecting a dimming frequency in the liquid crystal display device in FIG. 3.

Next, a configuration for selecting a dimming frequency for the PWM signal will be explained with reference to FIG. 5. FIG. 6 is a block diagram illustrating a configuration for selecting the dimming frequency.

Selection of the dimming frequency for the PWM signal S2 is performed mainly by the control board set 30. As described above, the control board set 30 is mounted on the outer surface of the bottom plate 14a of the chassis 14 (see FIGS. 4 and 5). The control board set 30 includes a dimming controller (a light source driver) 31 and a lighting circuit 32.

The dimming controller 31 includes a memory (a storage medium) 33 and a signal generator 34. It refers to the memory 33 according to an installation mode signal S1 output from the remote control signal receiver RR. Then, it selects a dimming frequency for the PWM signal S2 for driving of the cold cathode tubes 17 with brightness control.

The memory 33 includes storage medium such as a random access memory (RAM) and stores dimming frequencies, each of which is related to a corresponding installation mode signal S1. The dimming frequencies are defined based on volume of roaring sounds such that the roaring sounds are the smallest at the frequencies in the respective installation modes (wall mount mode and stand mode) of the television receiver TV. In this embodiment, the memory 33 stores the dimming frequencies: 230 Hz for the installation mode signal S1 that indicates the wall mount mode and 270 Hz for the installation mode signal S1 that indicates the stand mode. Namely, the different frequencies are stored for different modes.

In the dimming controller 31, the signal generator 34 generates the PWM signal S2 based on the dimming frequency selected with reference to the memory 33. The dimming controller 31 then sends the PWM signal S2 to the lighting circuit 32. The lighting circuit 32 supplies drive power to the cold cathode tubes 17 based on the PWM signal S2 input from the dimming controller 31.

Figure 7:
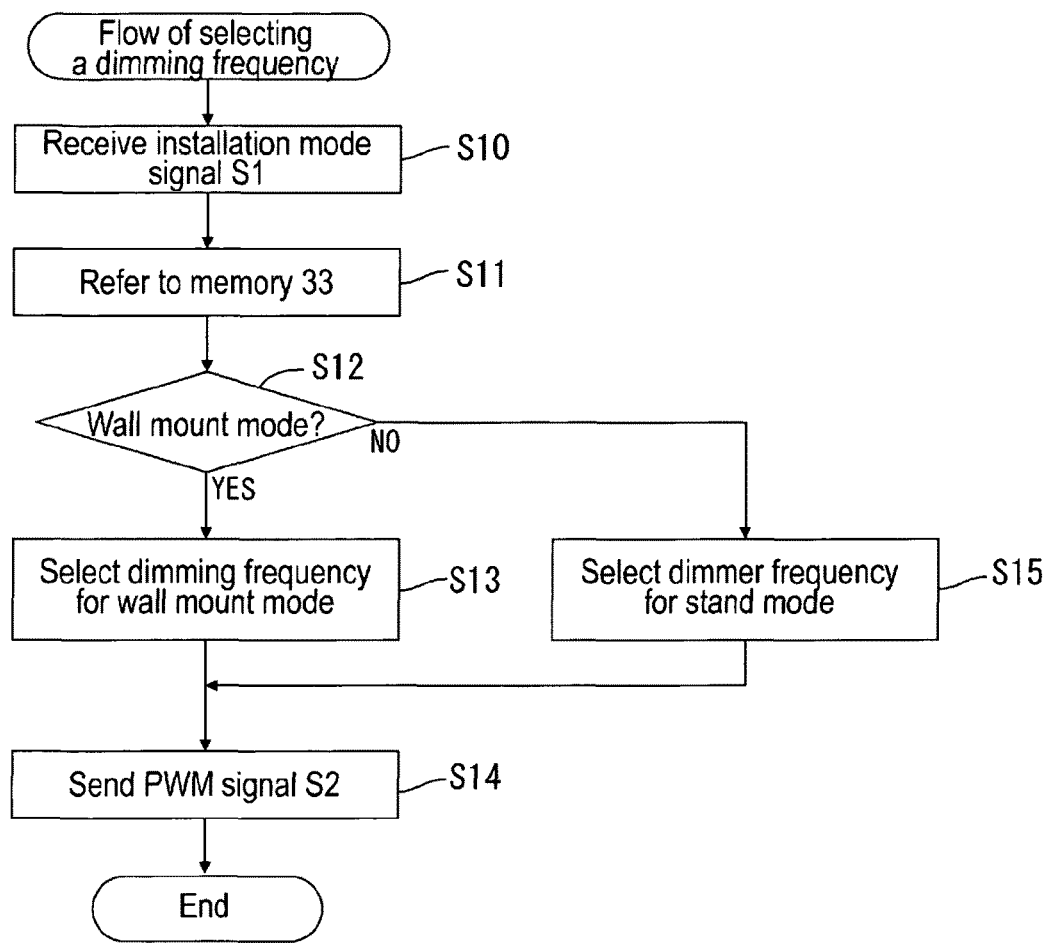
FIG. 7 is a flowchart illustrating a flow of selecting a dimming frequency.

Next, operation of selecting the dimming frequency in this embodiment will be explained. FIG. 7 is a flowchart illustrating a flow of selecting a dimming frequency.

The remote control signal receiver RR sends the installation mode signal S1 based on received information sent by the user via the remote control RC, and the dimming controller 31 receives the installation mode signal S1 (step S10).

The dimming controller 31 refers to the memory 33 based on the installation mode signal S1 (step S11). If the received installation mode signal S1 is a wall mount mode signal (YES in step S12), the dimming controller 31 selects the dimming frequency for wall mount mode (230 Hz in this embodiment) (step S13). In the dimming controller 31, the signal generator 34 generates the PWM signal S2 based on the selected dimming frequency for wall mount mode, and the dimming controller 31 sends the PWM signal S2 to the lighting circuit 32 (step S14).

If the received installation mode signal S1 is not a wall mount mode signal (NO in step S12), it is a stand mode signal in this embodiment. In this case, the dimming controller 31 selects the dimming frequency for stand mode (270 Hz in this embodiment) store in the memory 33. Further, in the dimming controller 31, the signal generator 34 generates the PWM signal S2 based on the dimming frequency selected with reference to the memory 33. The dimming controller 31 then sends the PWM signal S2 to the lighting circuit 32 (step S14).

The liquid crystal display device 10 of this embodiment includes the dimming controller 31 that drives the cold cathode tubes 17 using the PWM modulation signals. The dimming controller 31 can generate the PWM signals S2 using two different frequencies. Moreover, the dimming controller 31 can select one of the dimming frequencies according to the installation mode of the liquid crystal display device 10.

With this configuration, one of the dimming frequencies, at which the roaring sounds are less likely to be produced can be selected based on the installation mode of the liquid crystal display device 10. Therefore, the roaring sounds are less likely to be produced.

In the television receiver TV (the liquid crystal display device 10), the dimming frequency at which the roaring sounds are the largest in wall mount mode, which is the first installation mode, differs from that in stand mode, which is the second installation mode. In stand mode, the stand S is attached to the chassis 14 or a load on the chassis 14 itself varies. Thus, the natural vibration frequency of the chassis may vary. If the dimming frequency for the PWM signal S2 is not selectable, the roaring sounds may not be reduced in one of installation modes (e.g., stand mode) even if it can be reduced in the other installation mode (e.g., wall mount mode).

To reduce the roaring sounds regardless installation mode, the liquid crystal display device 10 of this embodiment is configured to select one frequency from two dimming frequencies (230 Hz and 270 Hz). Namely, the liquid crystal display device 10 can select the dimming frequency appropriate for the roaring sound reduction for each installation mode.

This embodiment includes the memory 33 that stores the two dimming frequencies.

With this configuration, the light source controller 31 can select one of the two dimming frequencies stored in the memory 33 and output it.

Further, this embodiment includes the remote control signal receiver RR for selecting the dimming frequency based on the signal input to the remote control signal receiver RR.

When the user inputs the installation mode of the liquid crystal display 10 through the remote control RC, the signal that indicates the installation mode is sent to the remote control signal receiver RR. The remote control receiver RR sends the installation mode signal S1 to the dimming controller 31. The dimming controller 31 selects the dimming frequency based on the installation mode signal S1. Namely, the user can reduce the roaring sounds through the operation of the remote control RC according to the installation mode of the liquid crystal display device 10. This provides the user with good operability and the user can achieve a high level of satisfaction.

The dimming frequency for the liquid crystal display device 10 may be set to the frequency for wall mount mode (230 Hz) at the factory. In this case, the user needs to change the dimming frequency to the one for stand mode only when using the liquid crystal display device 10 with the stand S for the first time. Therefore, the usability is even more improved.

In this embodiment, the distance between each cold cathode tube 17 and the bottom plate 14a of the chassis 14 is 0.8 mm, which is small.

In the thin liquid crystal display device 10, that is, when the distance between the cold cathode tube 17 and the chassis 14 is small, especially when it is smaller than 2.5 mm, the vibrations of the cold cathode tube 17 and the chassis 14 may resonate. As a result, the roaring sounds may be increased. Even in the thin liquid crystal display device 10, the configuration of this embodiment, in which the dimming frequency is selectable, the dimming frequency that is less likely to resonate with the chassis 14 can be properly selected. Therefore, the roaring sounds are less likely to be produced.

Second Embodiment

Figure 10:
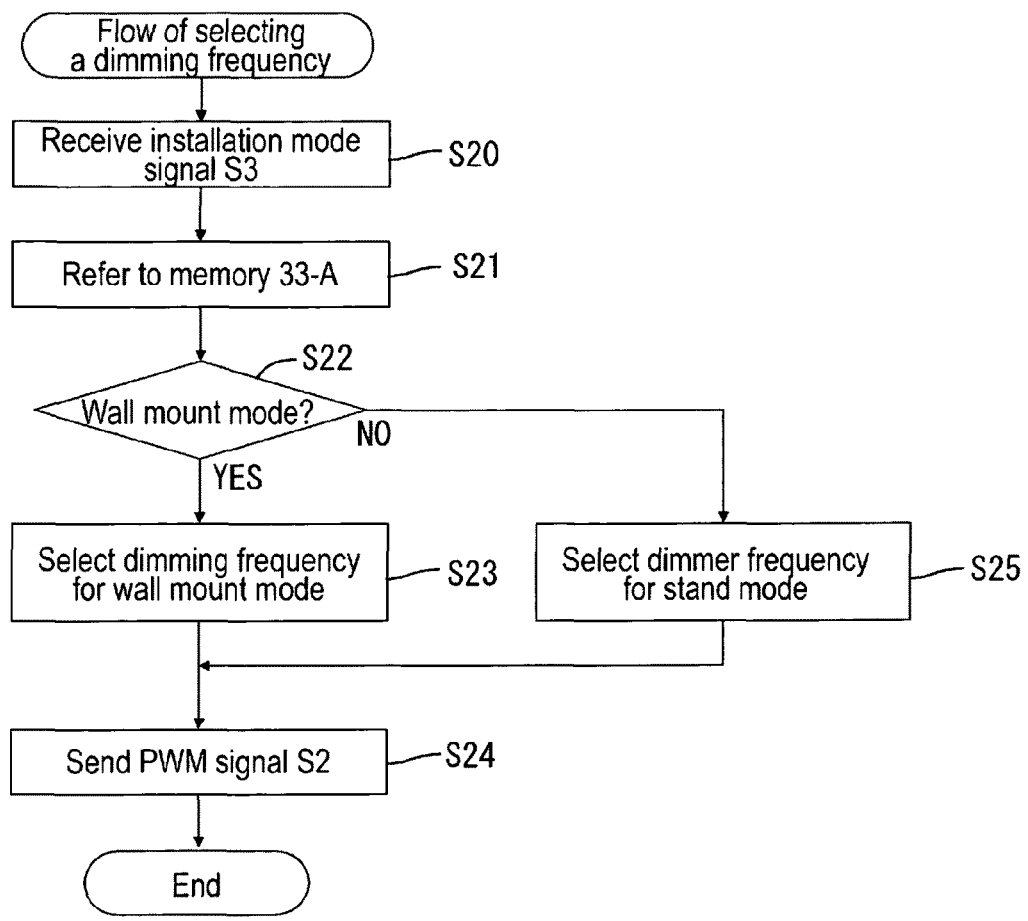
FIG. 10 is a flowchart illustrating a flow of selecting a dimming frequency.

Next, the second embodiment of the present invention will be explained with reference to FIGS. 8 and 10. The second embodiment includes a different means for selecting the dimming frequency from the first embodiment. The parts same as the first embodiment will be indicated by the same symbols with suffix "-A" added to the ends thereof. The same structure, function and effect will not be explained.

Figure 8:
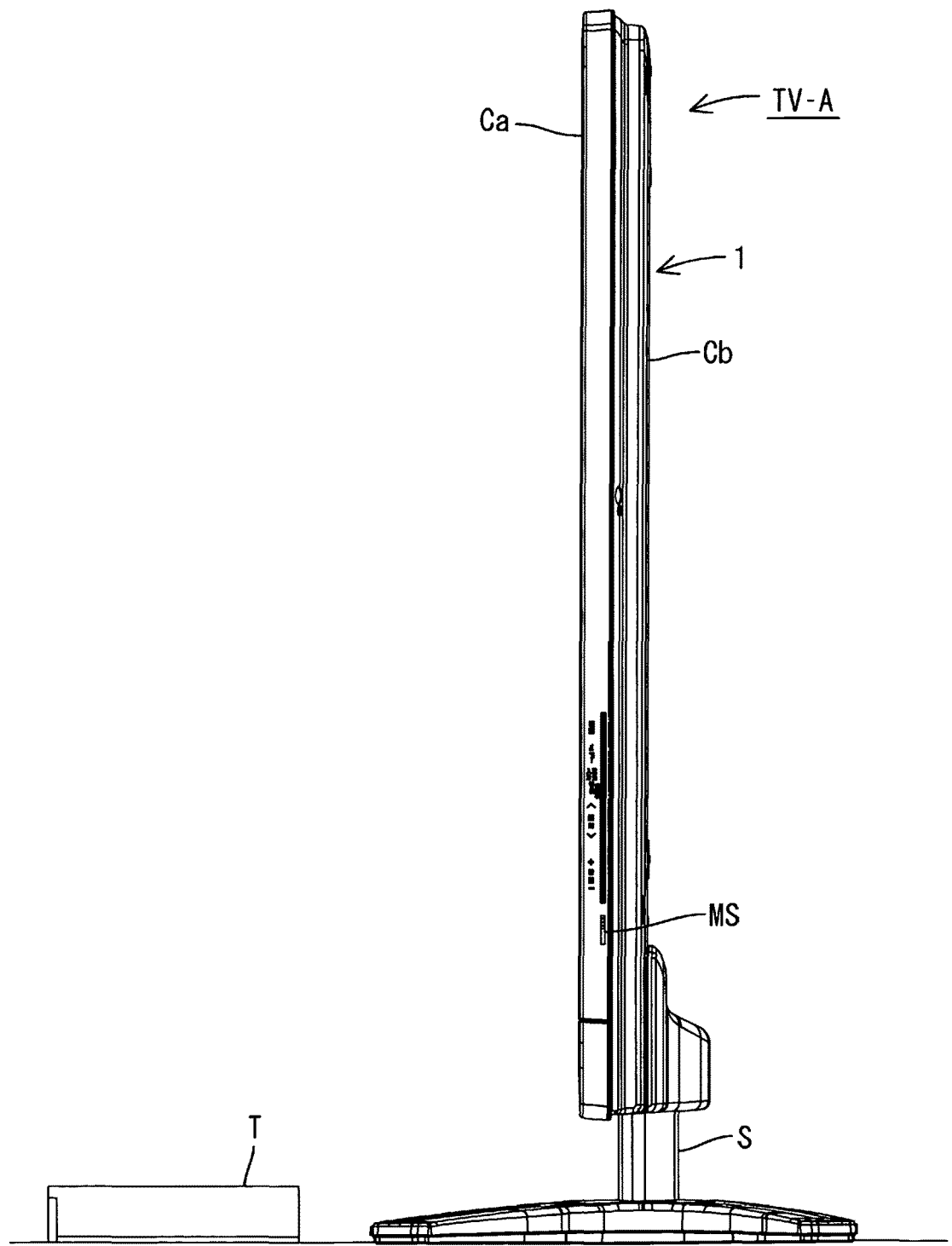
FIG. 8 is a side view illustrating a configuration of a television receiver according to the second embodiment of the present invention.

FIG. 8 is a side view illustrating a configuration of a television receiver of this embodiment. FIG. 8 illustrates the television receiver in stand mode.

As illustrated in FIG. 8, a television receiver TV-A has an installation mode switch MS (a dimming frequency selector) on a side thereof where a plurality of switches including a menu switch and a volume control switch are also arranged. The installation mode switch MS slides up and down. When the television receiver TV-A is used in wall mount mode, the installation mode switch is slid up. When the television receiver TV-A is used in stand mode, the installation mode switch is slid down.

Figure 9:
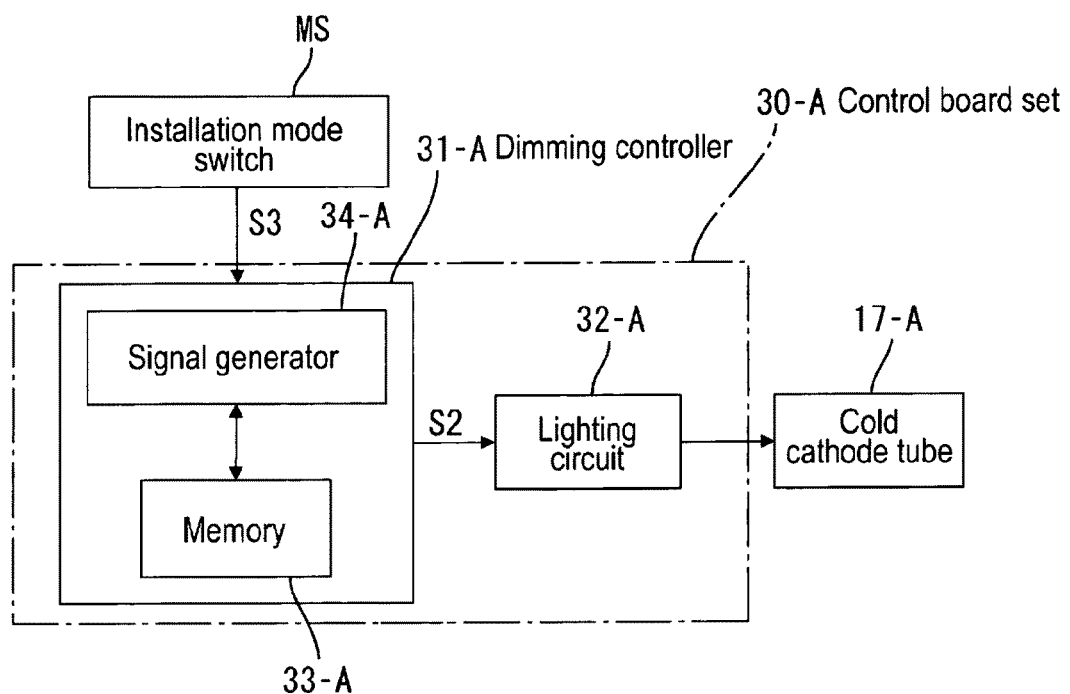
FIG. 9 is a block diagram illustrating a configuration for selecting a dimming frequency in the liquid crystal display device in FIG. 8.

An example of a configuration for selecting the dimming frequency for the PWM signals in the television receiver TV-A will be explained in detail with reference to FIG. 9. FIG. 9 is a block diagram illustrating a configuration for selecting a dimming frequency.

The installation mode switch MS is used for outputting a signal that indicates the wall mount mode when the user slides it up and a signal that indicates the stand mode when the user slides it down.

A control board set 30-A mounted on the outer surface of the bottom plate 14a of the chassis 14 includes a dimming controller 31-A and a lighting circuit 32-A The dimming controller 31A includes a memory 33-A and a signal generator 34A. It refers to the memory 33-A based on the installation mode signal S3 output from the installation mode switch MS and selects a dimming frequency for the PWM signal S2 for driving the cold cathode tubes 17-A with brightness control.

The memory 33-A stores the dimming frequencies: 230 Hz for the installation mode signal S3 that indicates the wall mount mode and 270 Hz for the installation mode signal S3 that indicates the stand mode. In the dimming controller 31-A, the signal generator 34-A generates the PWM signal S2 based on the dimming frequency selected by referring to the memory 33-A. The dimming controller 31-A then sends the PWM signal S2 to the lighting circuit 32-A.

Next, operation for selecting the dimming frequency in this embodiment will be explained. FIG. 10 is a flowchart illustrating a flow of selecting the dimming frequency.

First, the installation mode switch MS outputs the installation mode signal S3 that contains information input by the user through the sliding operation of the switch, and the installation mode signal S3 is input to the dimming controller 31-A (step S20).

The dimming controller 31-A refers to the memory 33-A based on the installation mode signal S3 (step S21). If the received installation mode signal S3 indicates the wall mount mode (YES in step S22), the dimming controller 31-A selects the dimming frequency for the wall mount mode (230 Hz in this embodiment) (step S23). Further, in the dimming controller 31-A, the signal generator 34-A generates the PWM signal S2 based on the selected dimming frequency for the wall mount mode, and the dimming controller 31-A sends the PWM signal S2 to the lighting circuit 32-A (step S24).

If the received installation mode signal S3 is not a signal that indicates the wall mount mode (NO in step S22), the television receiver TV-A is in stand mode in this embodiment. In this case, the dimming controller 31-A selects the dimming frequency for the stand mode (270 Hz in this embodiment) stored in the memory 33-A (step S25). Further, in the dimming controller 31-A, the signal generator 34-A generates the PWM signal S2 based on the selected dimming frequency for the stand mode, and the dimming controller 31-A sends the PWM signal S2 to the lighting circuit 32-A (step S24).

As described above, the television receiver TV-A includes the installation mode switch MS for selecting the dimming frequency and the light frequency is selected based on the operation of the installation mode switch MS.

With this configuration, the dimming frequency at which the roaring sounds are least likely to be produced among the predetermined frequencies can be selected by the user through the operation of the installation mode switch according to the installation mode. Namely, the user can select the appropriate dimming frequency with simple operation and the roaring sounds are less likely to be produced.

Third Embodiment

Figure 12:
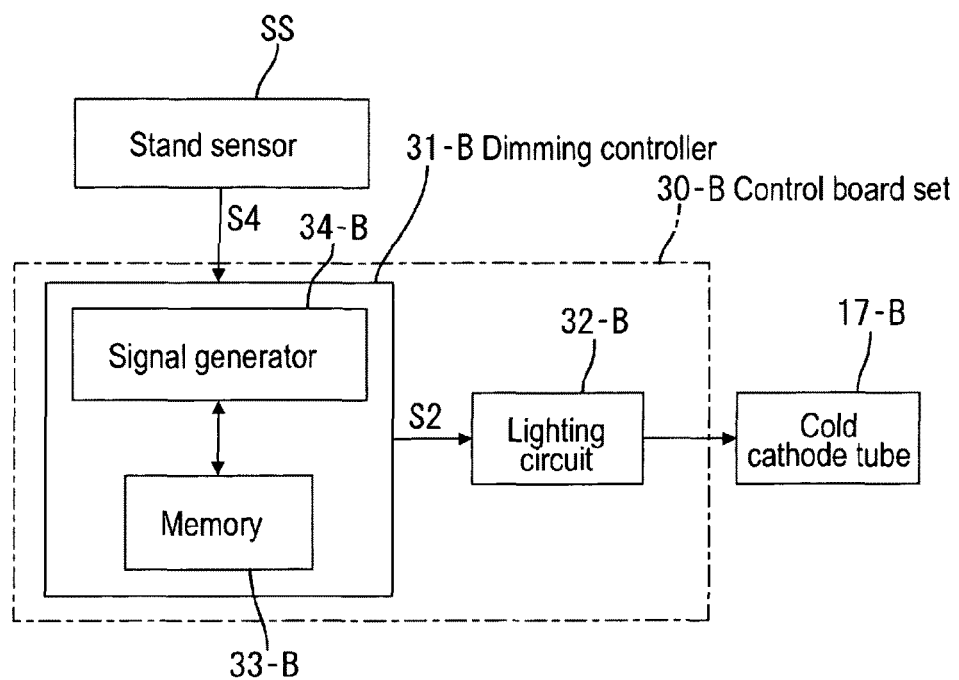
FIG. 12 is a block diagram illustrating a configuration for selecting a dimming frequency in the liquid crystal display device in FIG. 11.
Figure 13:
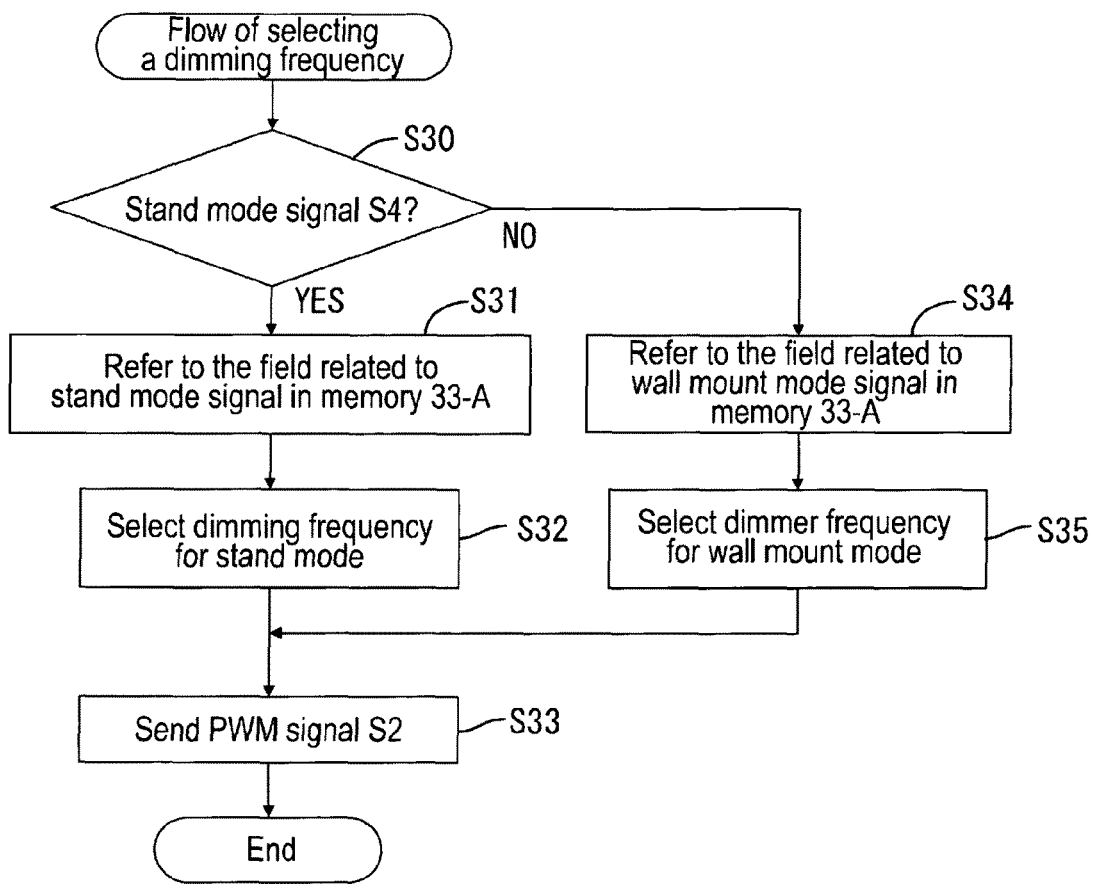
FIG. 13 is a flowchart illustrating a flow of selecting a dimming frequency.

The third embodiment of the present invention will be explained with reference to FIGS. 11 to 13. The third embodiment includes a different means for selecting the dimming frequency from the first and the second embodiments. The parts same as the first embodiment will be indicated by the same symbols with suffix "-B" added to the ends thereof. The same structure, function and effect will not be explained.

Figure 11:
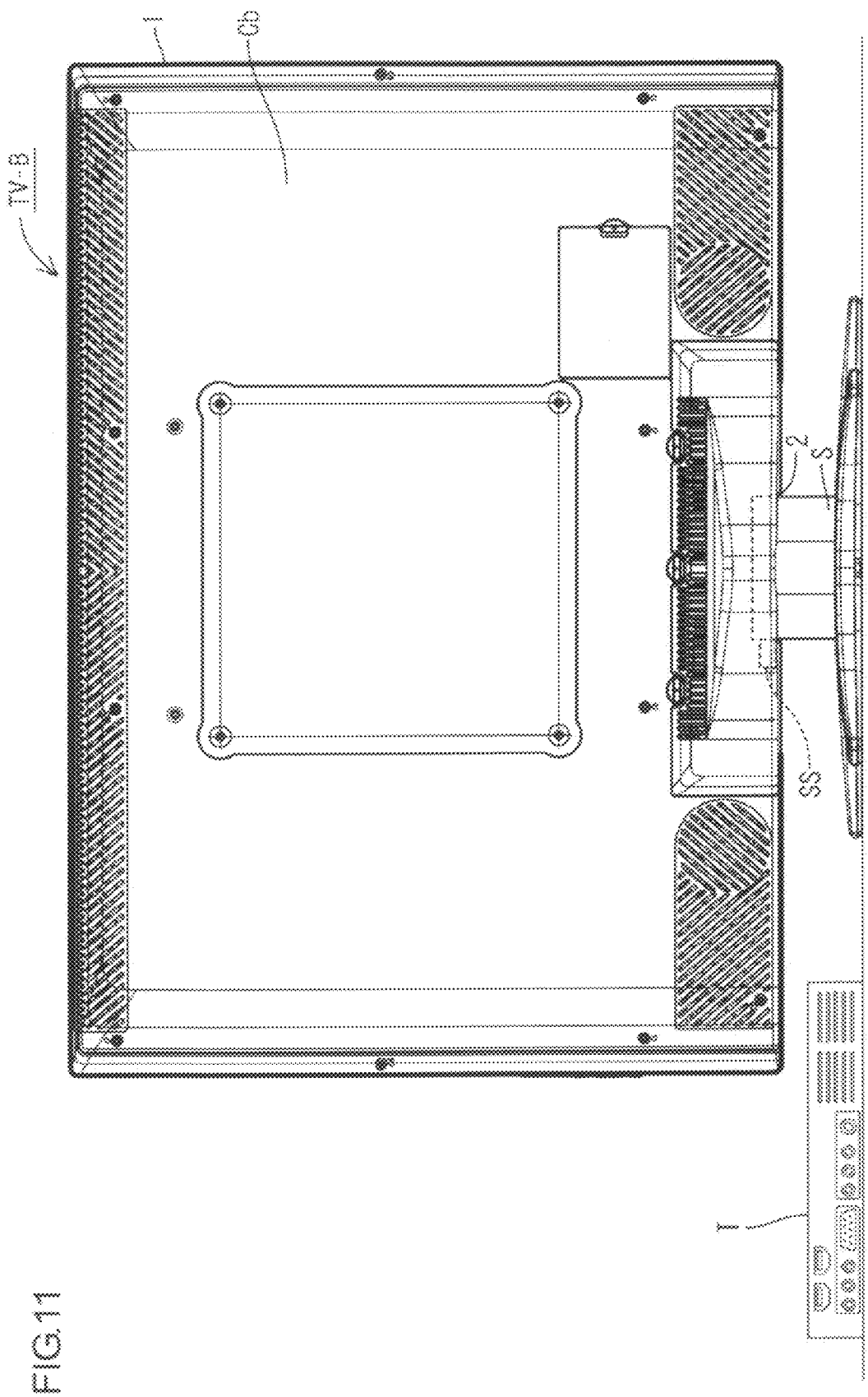
FIG. 11 is a rear view illustrating a configuration of a television receiver according to the third embodiment of the present invention.

FIG. 11 is a rear view illustrating a configuration of a television receiver of this embodiment. FIG. 11 illustrates the television receiver in stand mode.

As illustrated in FIG. 11, the television receiver TV-B has a stand mounting hole 2 at the bottom for receiving the stand S. Further, a stand sensor (an installation mode sensor) SS is arranged adjacent to the stand mounting hole 2. The stand sensor SS detects an end (an upper end) of the stand S when it is inserted in the stand mounting hole 2. A touch sensor is used for the stand sensor SS. When the stand S inserted in the stand mounting hole 2 touches a protruding sensing part of the stand sensor SS inside the stand mounting hole 2, the insertion of the stand S is detected. When the insertion of the stand S is detected, the stand sensor SS determines that the television receiver TV-B is in stand mode and outputs the stand mode signal S4. The stand sensor SS is not limited to the touch sensor. An optical sensor and a magnetic sensor may be used.

A configuration of the television receiver TV-B for selecting the dimming frequency for the PWM signal will be explained with reference to FIG. 12. FIG. 12 is a block diagram illustrating a configuration for selecting a dimming frequency.

A control board set 30-B is mounted to the rear surface (on an opposite side from the cold cathode tubes 17) of the bottom plate 14a of the chassis 14. It includes a dimming controller 31-B and a lighting circuit 32-B.

The dimming controller 31-B includes a memory 33-B and a signal generator 34-B. It refers to the memory 33-B based on the stand mode signal S4 output from the stand sensor SS and selects the dimming frequency for the PWM signal S2 for driving the cold cathode tubes 17-B with brightness control.

The memory 33-B has a field related to the stand mode signal S4 and other field (related to the wall mount mode signal in this embodiment). The memory 33-B stores the dimming frequencies: 270 Hz for the stand mode signal S4 and 230 Hz for the other signal. In the dimming controller 31-B, the signal generator 34-B generates the PWM signal S2 based on the dimming frequency selected by referring the field in the memory 33-B, and the dimmer controller 31-B sends the PWM signal S2 to the lighting circuit 32-B.

Next, how the dimming frequency is selected in this embodiment will be explained. FIG. 13 is a flowchart illustrating a flow of selecting the dimming frequency.

When the stand S is inserted in the stand mounting hole 2, the stand sensor SS outputs the stand mode signal S4. When the dimming controller 31-B receives the stand mode signal S4 (YES in step S30), it refers to the field related to the stand mode signal in the memory 33-B (step S31) and selects the dimming frequency (270 Hz in this embodiment) for the stand mode (step S32). Further, in the dimming controller 31-B, the signal generator 34-B generates the PWM signal S2 based on the selected dimming frequency for the stand mode, and the dimming controller 31-B sends the PWM signal S2 to the lighting circuit 32-B (step S33).

If the dimming controller 31-B does not receive the stand mode signal S4 (NO in step S30), the television receiver TV-B in this embodiment is in wall mount mode. In this case, the dimming controller 31-B refers to the field related to the wall mount mode signal in the memory 33-B (step S34), and selects the dimming frequency (230 Hz in this embodiment) for the wall mount mode (step S35). Further, in the dimming controller 31-B, the signal generator 34-B generates the PWM signal S2 based on the selected dimming frequency for the wall mount mode, and the dimming controller 31-B sends the PWM signal S2 to the lighting circuit 32-B (step S33).

As described above, the television receiver TV-B of this embodiment includes the stand sensor SS for detecting the television receiver TV-B is in stand mode. The dimming frequency is selected based on the stand mode signal S4 output from the stand sensor SS.

When the television receiver TV-B (the liquid crystal display device 10) is installed in stand mode, the stand sensor SS detects it. The dimming frequency at which the roaring sounds are least likely to be produced among the predetermined frequencies can be selected based on the result of the detection. With this configuration, the user does not need to manually select the dimming frequency.

Fourth Embodiment

Figure 16:
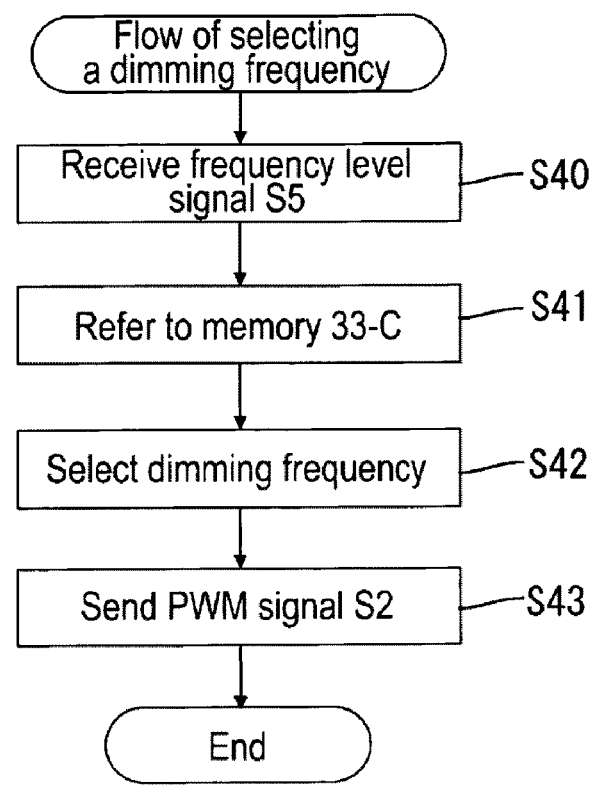
FIG. 16 is a flowchart illustrating a flow of selecting a dimming frequency.

Next, the fourth embodiment of the present invention will be explained with reference to FIGS. 14 to 16. This embodiment has a different memory configuration for the dimming frequencies. The parts same as the first embodiment will be indicated by the same symbols with suffix "-C" added to the ends thereof. The same structure, function and effect will not be explained.

Figure 14:
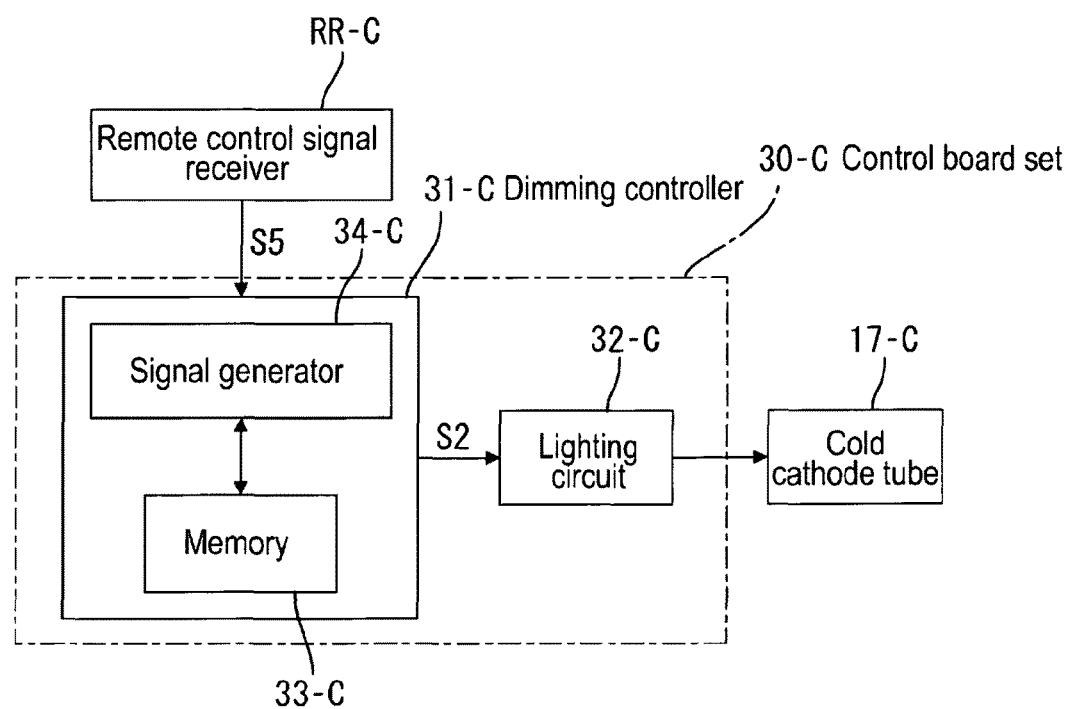
FIG. 14 is a block diagram illustrating a configuration for selecting a dimming frequency in the liquid crystal display device according to the fourth embodiment of the present invention.

FIG. 14 is a block diagram illustrating a configuration for selecting the dimming frequency in this embodiment. FIG. 15 is a table containing dimming frequencies stored in a memory.

As illustrated in FIG. 14, a dimming controller 31-C for selecting the dimming frequency includes a memory 33-C and a signal generator 34-C. It refers to the memory 33-C based on a frequency level signal S5 output from a remote control signal receiver RR-C, and selects the dimming frequency of the PWM signal S2 for driving cold cathode tubes 17-C with brightness control.

The memory 33-C contains a lookup table illustrated in FIG. 15. Five different dimming frequencies are written in the second column of the table in the memory 33-C and frequency levels 1 to 5 are related to the respective dimming frequencies (the first column in FIG. 15). In this embodiment, Frequency level 1 indicates the wall mount mode and the dimming frequency is 230 Hz. Frequency level 5 indicates the stand mode and the dimming frequency is 270 Hz. Frequency levels 2, 3 and 4 are related to the dimming frequencies of 240 Hz, 250 Hz and 260 Hz, respectively.

The television receiver TV-C of this embodiment includes the remote control signal receiver RR-C and the dimming frequency can be selected through the operation of the remote control RC-C by the user. Specifically, the frequency level can be selected from frequency levels 1 to 5 with the remote control RC-C and a signal related to the frequency level is sent to the remote control signal receiver RR-C.

Next, how the dimming frequency is selected in this embodiment will be explained. FIG. 16 is a flowchart illustrating a flow of selecting a dimming frequency.

The remote control signal receiver RR-C outputs a frequency level signal S5 that indicates information sent from the remote control RC-C according to the operation thereof by the user, and inputs the frequency level signal S5 to the dimming controller 31-C (step S40).

The dimming controller 31-C refers to the memory 33-C based on the frequency level signal S5 (step S41) and selects the dimming frequency related to the frequency level signal (step S42). Further, in the dimming controller 31-C, the signal generator 34-C generates the PWM signal S2 based on the selected dimming frequency and the dimming controller 31-C sends the PWM signal S2 to the lighting circuit 32-C (step S43).

By selecting frequency level 1 in wall mount mode or frequency level 5 in stand mode, the roaring sounds are less likely to be produced. Even when the roaring sounds cannot be reduced to a preferable level with the above frequency level, the user can select the frequency level from frequency levels 1 to 5. Namely, the user can select the dimming frequency at which the roaring sounds are least likely to be produced.

Other Embodiment

The present invention is not limited to the embodiments explained above with reference to the figures. For example, the following embodiments may be included in the technical scope of the present invention.

(1) In the above embodiments, the configuration including the memory that stores a plurality of the dimming frequencies and selecting one of the dimming frequencies is used as an example of a light source controller. However, the configuration of the present invention is not limited to that configuration. For example, the PWM signal for any frequency may be generated by a logic circuit in the signal generator included in the light source controller according to the installation mode of the display device.

(2) In the above embodiments, the configurations for selecting the dimming frequency based on the installation mode signal corresponding to the operation by the user or based on the result of the detection by the installation mode sensor are separately used. However, the television receiver may include both configurations. In this case, the selection of the dimming frequency according to the operation by the user should have priority over the selection according to the result of the detection by the installation mode sensor for good usability and user satisfaction.

(3) In the above embodiments, the wall mount mode and the stand mode are used as installation modes of the liquid crystal display device. However, the installation modes are not limited to those two modes. Moreover, the present invention includes configurations in which dimming frequencies at which the roaring sounds are less likely to be produced in installation modes other than those two installation modes are stored.

(4) In the above embodiments, the dimming frequency can be selected in a range from 230 Hz to 270 Hz. However, this frequency range is a setting used in one of the example configurations. Different configurations using the dimming frequencies inside and outside the above range are also included in the present invention.

(5) In the above embodiments, the cold cathode tubes are used as light sources. However, other kinds of fluorescent lamps including hot cathode tubes can be used.

This is a complete and current listing of the claims, marked with status identifiers in parentheses. The following listing of claims will replace all prior versions and listings of claims in the application.

The invention claimed is:

1. A display device comprising:
a light source; and
a light source driver, wherein:
the light source driver is configured to generate a pulse width modulation signal using a dimming frequency selected from a plurality of dimming frequencies according to an installation mode of the display device, and to drive the light source with brightness control using the pulse width modulation signal, and
the installation mode includes a first installation mode in which the display device is installed in a wall mount style and a second installation mode in which the display device is held by a stand.

2. The display device according to claim 1, wherein the light source driver includes a storage medium on which dimming frequencies are stored.

3. The display device according to claim 1, further comprising:
a signal receiver configured to receive an external signal, wherein the dimming frequency is based on a signal input to the signal receiver.

4. The display device according to claim 1, further comprising:
a dimming frequency selector through which selecting operation of the dimming frequency is performed, wherein the selected dimming frequency is based on the selecting operation performed through the dimming frequency selector.

5. The display device according to claim 1, further comprising:

an installation mode detector configured to detect the installation mode, wherein the dimming frequency is based on a result of detection by the installation mode detector.

6. The display device according to claim 1, further comprising:

a chassis having a bottom plate, the light source being on the bottom plate such that a distance between the light source and the bottom plate of the chassis is smaller than 2.5 mm.

7. The display device according to claim 1, further comprising:

a display panel illuminated by the light source, wherein the display panel is a liquid crystal panel.

8. A television receiver comprising:

the display device according to claim 1.

9. The display device of claim 1, further comprising:

a bottom plate; and a light source holder on the bottom plate.

10. The display device of claim 9, wherein the light source is at most 2.5 mm from the bottom plate.

* * * * *